US012653145B2

(12) United States Patent
Silber

(10) Patent No.: US 12,653,145 B2
(45) Date of Patent: Jun. 16, 2026

(54) COLLAPSIBLE PET BED

(71) Applicant: Metro Marketing Group, Inc., Tenafly, NJ (US)

(72) Inventor: Alfred Silber, Tenafly, NJ (US)

(73) Assignee: Metro Marketing Group, Inc., Tenafly, NJ (US)

( * ) Notice: Subject to any disclaimer, the term of this patent is extended or adjusted under 35 U.S.C. 154(b) by 0 days.

(21) Appl. No.: 19/009,713

(22) Filed: Jan. 3, 2025

(65) Prior Publication Data

US 2025/0351799 A1      Nov. 20, 2025

Related U.S. Application Data

(60) Provisional application No. 63/649,184, filed on May 17, 2024.

(51) Int. Cl.
A01K 1/035 (2006.01)

(52) U.S. Cl.
CPC ................................... A01K 1/0353 (2013.01)

(58) Field of Classification Search
CPC .................................................... A01K 1/0353
See application file for complete search history.

(56) References Cited

U.S. PATENT DOCUMENTS

| | | | | |
|---|---|---|---|---|
| 2,936,102 A | * | 5/1960 | Field | A01K 1/0353 |
| 3,537,116 A | * | 11/1970 | Kain | A47G 9/0246 |
| 5,351,348 A | | 10/1994 | Berger | |

| | | | | |
|---|---|---|---|---|
| 5,497,729 A | * | 3/1996 | Lord | A01K 1/02 119/20 |
| 6,408,463 B1 | * | 6/2002 | Palacio | A47D 13/06 5/424 |
| 7,225,756 B2 | | 6/2007 | Greenfield | |
| D567,456 S | | 4/2008 | Martin | |
| D631,207 S | | 1/2011 | Shing | |
| 8,740,006 B2 | * | 6/2014 | Matson | B65D 1/34 220/571 |
| D763,591 S | | 8/2016 | King | |
| D926,390 S | | 7/2021 | Roost | |
| 11,278,001 B2 | | 3/2022 | Autenrieth | |
| D1,004,212 S | | 11/2023 | Li | |
| D1,008,570 S | | 12/2023 | Bernal | |
| 2002/0108578 A1 | | 8/2002 | Kostal | |

(Continued)

FOREIGN PATENT DOCUMENTS

DE            6919586 U      9/1969

*Primary Examiner* — Joshua J Michener
*Assistant Examiner* — Henry Hooper Mudd
(74) *Attorney, Agent, or Firm* — Gerald E. Hespos; Michael J. Porco

(57) ABSTRACT

A collapsible pet bed has a base. A rear wall is hinged to a rear side of the base and can rotate between a collapsed position where the rear wall and the base lie in a common plane and an erected position where the rear wall is perpendicular to the base. A side wall is hinged to a side of the base and can rotate between a collapsed position where the side wall and the base lie in a common plane and an erected position where the side wall is perpendicular to both the base and the rear wall. Snaps or other such connections releasably hold the rear wall and the side wall at a vertical corner when the pet bed is in the erected condition. Corner guards can be mounted on the convex corners of the pet bed to prevent damage caused by a pet gnawing at the corners.

17 Claims, 8 Drawing Sheets

(56) References Cited

U.S. PATENT DOCUMENTS

| | | |
|---|---|---|
| 2004/0134433 A1 | 7/2004 | Holder |
| 2008/0173627 A1 | 7/2008 | Martin |
| 2014/0230735 A1 | 8/2014 | Coulter |
| 2015/0068459 A1 | 3/2015 | Leffler |
| 2019/0297838 A1 | 10/2019 | Miller |
| 2020/0367466 A1 | 11/2020 | June |
| 2022/0408687 A1 | 12/2022 | Heath |

* cited by examiner

COLLAPSIBLE PET BED

CROSS-REFERENCE TO RELATED APPLICATION

This application claims priority to U.S. Provisional Patent Appl. No. 63/649,184, filed May 17, 2024, the entire disclosure of which is incorporated herein by reference.

BACKGROUND

1. Field of the Invention

The invention relates to a pet bed that is suitable for use at home and is particularly well suited for use at a pet boarding facility.

2. Related Art

Many pet behavior analysts recognize the importance of preventing or reducing fear, anxiety and stress in pets. The pet bed is a focal point in the life of most pets and a properly configured pet bed is believed to reduce fear, anxiety and stress. In this regard, many pet owners believe that their pets seek the comfort and security of a well defined corner for nestling and sleeping. Many pet beds that are used at home resemble a couch used by humans but are dimensioned appropriately for the pet. Pet beds of this type provide well-defined corners into which the pet can nestle.

Pet boarding has become a growth industry. Pet boarding facilities are used by pet owners who travel for business or for recreation to locations that cannot accommodate their pets. Pet bedding has not been a high priority for many pet boarding facilities due to the size and cost of pet beds. Thus, a simple flat pad or pillow is more likely to be found at a typical pet boarding facility. A pet's stay at a pet boarding facility is likely to be a time of high fear, anxiety and stress due to the unfamiliar location and the separation from the pet owners. The absence of a corner to nestle contributes to the stress and anxiety of the pet at a pet boarding facility.

Many pets gnaw on nearby objects, particularly at times of stress or anxiety. A corner or edge of a pet bed is a convenient target for gnawing. Anxious pets are known to damage or destroy expensive pet beds used at pet boarding facilities by gnawing through corners or edges of the pet bed.

An object of the invention is to provide an inexpensive pet bed that is suitable for use at home and is particularly well suited for use at a pet boarding facility.

A further object of the invention is to provide a pet bed that is inexpensive and can be stored in a very small space when not in use.

Another object of the invention is to provide a pet bed that is easy to clean.

Still a further object of the invention is to provide a pet bed that is resistant to damage caused by gnawing.

SUMMARY

One aspect of the invention relates to a pet bed having a base with at least first and second linear side edges intersecting at a corner of the base. The base of some embodiments is rectangular and has two opposed pairs of parallel side edges. Thus, the base of this latter embodiment has a third side edge that is parallel to the first side edge and a fourth side edge that is parallel to the second side edge.

The pet bed of some embodiments further has a first side wall hinged to the base at the first side edge and a second side wall hinged to the base at the second side edge. Thus, each of the first and second side walls can be rotated between a first position where the sidewalls lie substantially in the same plane as the base and a second position where the sidewalls are substantially perpendicular to the base. The first and second side walls that are in the second position meet one another at a substantially right angle corner that may extend substantially perpendicularly up from the base.

The pet bed of the above-described embodiment further has means for holding the first and second side walls in substantially edge-to-edge relationship at a vertical corner extending up from the base. The means for holding the sidewalls in the erect condition can comprise interengageable loops, interengageable hooks, interengageable snaps, interengageable buttons and button holes or hook and loop fasteners similar to those sold under the trademark VELCRO.

The base and the sidewalls of the above-described pet bed are provided respectively with a layer of padding and two outer covers that enclose the padding. For example, the padding of the base may comprise a polyurethane foam, a memory foam (e.g. viscoelastic foam), a layer of high density foam with a layer of memory foam and/or a layer of a gel material. The total thickness of the padding of the base in some embodiments is in a range of 1 inch to 2 inches. The padding of the sidewalls can be thinner than the padding of the base. For example, the padding of the sidewalls may comprise a memory foam having a thickness of about 0.25 inch to 0.50 inch and a layer of a different material, such as an EVA foam that is thinner than the memory foam. The upper and lower covers of some embodiments are formed from a vinyl, PVC or nylon sheet material fabric. The upper and lower layers may be formed from the same materials or from different materials.

The pet bed is formed in one embodiment by placing the bottom cover on a horizontal surface, and positioning the padding of the base and the padding of the sidewalls on the material that will form the bottom cover. This positioning of the padding that forms the sidewalls is carried out so that the padding that forms the sidewalls will be spaced from the padding that forms the base by a distance of approximately 0.25 inch to 1.50 inch. This spacing should be sufficed to enable the sidewall and the rear wall to be rotated up from the base and into an erect substantially vertical condition when the base is horizontal. The upper cover then is placed over the padding that forms the base, the rear wall and the sidewall. The upper and lower covers then are heat sealed, fused, welded, sewn, adhered or otherwise fastened to one another along regions between the padding for the base and the padding for the rear wall and the sidewall and also along the outer periphery of the assembly formed by the covers and the padding.

Gnaw-resistant protective corner guards can be mounted to each exposed convex corner region of the pet bed. Thus, a pet bed that has only the base can have corner guards on each convex corner (e.g. four corner guards on a pet bed consisting of a rectangular base). For example, each corner guard can have a base wall and an opposed cover wall that may be parallel to one another and at least one connecting wall extending between the base wall and the cover wall. In some embodiments, the opposed base wall and cover wall are right triangles. In other embodiments, base wall and the cover wall may define squares or sectors spanning a quarter of a circle. The at least one connecting wall preferably comprises two connecting walls that are joined unitarily to one another at a right angle. Additionally, the connecting walls may be joined unitarily to one of the cover wall. Thus, the two connecting walls and the cover wall may be molded to form a unitary matrix of a hard rigid resin, such as acrylonitrite butadiene styrene (ABS), polyvinyl chloride (PVC) or nylon. Tubular posts may extend perpendicularly from the cover wall, and the tubular posts may be formed with internal threads. The second base wall may be formed with apertures that will register with the internally tubular posts of the cover wall. Apertures may be formed through the covers and the pads of the pet bed at positions near the corners, and the apertures can receive the tubular posts when the cover wall and the connecting walls are nested over one of the corner regions of the ped bed. The base wall then is mounted over the corner region of the ped bed so that the apertures of the base wall register coaxially with the tubular posts. Screws then are passed through the apertures in the base wall and are tightened into the tubular posts for protectively enclosing the corner region in a gnaw-proof manner. Heads of the screws preferably are flush with the outer surface of the base wall or are countersunk relative to the base wall. It will be appreciated that other connections can be provided instead of screws, such as welding or adhesion.

The means for holding the first and second side walls in an erect condition can be interconnected at this time. For example, hooks, snaps, buttons and/or rings that are interengageable with one another can be mounted or formed at locations near the edges of the rear wall and the sidewall that will meet at a corner above the base.

The pet bed can be stored with the rear wall and the sidewall lying substantially in a common plane with the base. This planar arrangement of the rear wall and the sidewall facilitates cleaning of the pet bed and storage of one or more pet beds between uses. However, the pet bed can be put into a position for use merely by rotating the rear wall 90° about the hinge line between the base and the rear wall and by rotating the sidewall 90° about the hinge line between the base and the sidewall. Thus, one of the side edges of the rear wall will abut a side edge of a sidewall. These abutting edges of the rear wall and the sidewall can be secured releasably in this upright position by connecting the hooks, loops or other fastening means mentioned above. Thus, the interconnected rear wall and sidewall form a vertically extending corner into which the pet can nestle.

The embodiment described above has the base, the rear wall and a sidewall. An alternate embodiment has a base, a rear wall and opposed first and second sidewalls. The base, the rear wall and the opposed first and second sidewalls can be stored in a substantially coplanar condition that facilitates cleaning and storage, as explained above. However, the rear wall and the sidewalls can be folded relative to the base for use. In this regard, opposite edges of the rear wall can be secured in substantially edge-to-edge relationship with the rear edges of the first and second sidewalls to form two vertical corners into which the pet can nestle.

A further embodiment has the above-described base, the rear wall and the opposed first and second sidewalls as well as front wall hingedly connected to the edge of the base opposite the edge that has the rear wall. The front wall may be dimensioned identically to the rear wall. However, in other embodiments the front wall is dimensioned to have a lower projecting height than the rear wall or the first and second sidewalls.

Certain optional embodiments are described below with reference to the drawings.

DETAILED DESCRIPTION

Figures 1, 2, 3:
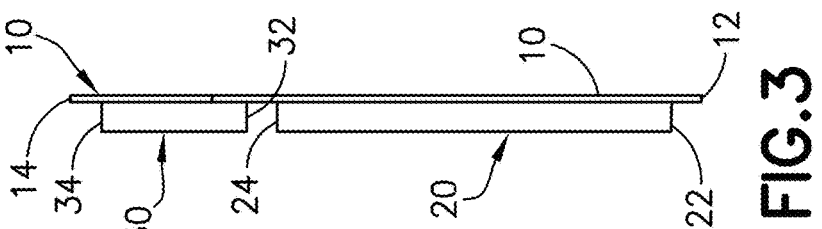
FIG. 1 is a top plan view of a partially assembled pet bed in accordance with a first embodiment of the invention.
FIG. 2 is a front elevational view of the partially assembled pet bed of FIG. 1.
FIG. 3 is a left side elevational view of the partially assembled pet bed of FIGS. 1 and 2.

A collapsible pet bed in accordance with a first embodiment of the invention includes an initially rectangular bottom cover 10 formed from a flexible, durable and comfortable sheet material, such as a PVC mesh, a vinyl, PVC or nylon fabric. The bottom cover 10 has opposite front and rear edges 12 and 14 and opposite first and second side edges 16 and 18. The dimensions of the bottom cover 10 are a function of the approximate size of the pet for which the pet bed is intended. For example, a pet bed for a 40 pound dog may have a bottom cover 10 approximately 30.25 inches long as measured parallel to the front and rear edges 12 and 14 and a width or depth of about 21.75 inches as measured parallel to the first and second side edges 16 and 18 of the bottom cover 10.

A substantially rectangular base pad 20 is positioned on the bottom cover 10. The base pad has opposite front and rear edges 22 and 24 and opposite first and second side edges 26 and 28. The dimensions of the bottom pad will be a function of the approximate size of the pet for which the pet bed is intended. For example, a pet bed for the above-referenced 40 pound dog may have a base pad 20 with a length of approximately 23 inches measured parallel to the front and rear edges 22 and 24 and a width or depth of about 14.5 inches measured parallel to the first and second side edges 26 and 28. The base pad 20 is positioned on the bottom cover 10 so that the front edge 22 of the base pad 20 is spaced rearward from the front edge 12 of the bottom cover 10 by a distance of about 0.25 inch to 0.75 inch. The second side edge 28 of the base pad 20 is positioned substantially parallel to the second side edge 18 of the bottom cover 10 and at a position spaced inward from the second side edge 18 of the bottom cover 10 by a distance of about 0.25 inch to about 0.75 inch. The base pad 20 is formed from at least one layer of a durable cushioning material, such as a layer of 30D PE foam having a thickness of about 1.50 inch or polyurethane foam having a thickness of about 1.25 inches bonded with a layer of memory foam (viscoelastic foam) of about 0.25 inch for a total thickness of the base pad 20 of about 1.5 inches.

A substantially rectangular rear pad 30 is positioned on the bottom cover 10 at a position between the base pad 20 and the rear edge 14 of the bottom cover 10. More particularly, the rear pad 30 has a front edge 32 aligned substantially parallel to and spaced from the rear edge 24 of the base pad 20 and a rear edge 34 aligned substantially parallel to and spaced from the rear edge 14 of the bottom cover 10. The rear pad 30 also has first and second side edges 36 and 38 that align respectively with the first and second side edges 26 and 28 of the base pad 20. Thus, the second side edge 38 of the rear pad 30 is spaced inward from and parallel to the second side edge 18 of the bottom cover 10. The rear pad 30 need not be as thick as the base pad 20. For example, the rear pad may comprise a layer of memory foam with a thickness in a range of 0.25 inch to 0.50 inch. The illustrated embodiment shows the corner region between the rear edge 34 and the second side edge 38 of the rear pad 30 meeting at a right angle. However, this right angle corner is an option, and the rear edge 34 and the second side edge 38 can meet at a rounded corner region.

A substantially rectangular side pad 40 is positioned on the bottom cover 10 at a position between the base pad 20 and the first side edge 16 of the bottom cover 10. The side pad 40 has opposite substantially parallel front and rear edges 42 and 44 and opposite substantially parallel first and second side edges 46 and 48. The front edge 42 of the side pad 40 is aligned with the front edge 22 of the base pad 20 and is spaced inward from the front edge 12 of the bottom cover 10. The rear edge 44 of the side pad 40 is substantially aligned with the rear edge 24 of the base pad 20. The first side edge 46 of the side pad 40 is spaced inward from and substantially parallel to the first side edge 16 of the bottom cover 10. The second side edge 48 of the side pad 40 is aligned substantially parallel to the first side edge 26 of the base pad 20 and is spaced from the first side edge 26 of the base pad 20. The side pad 40 can be formed from the same material as the rear pad 30 and may have the same thickness as the rear pad 30.

FIG. 1 shows a substantially unused area of the bottom cover 10 where the rear edge 14 and the second side edge 16 of the bottom cover meet. This substantially rectangular area is unneeded and can be removed at an appropriate time in the manufacturing process, including before positioning the pads 20, 30, 40 on the bottom cover 10.

Figures 4, 5, 6:
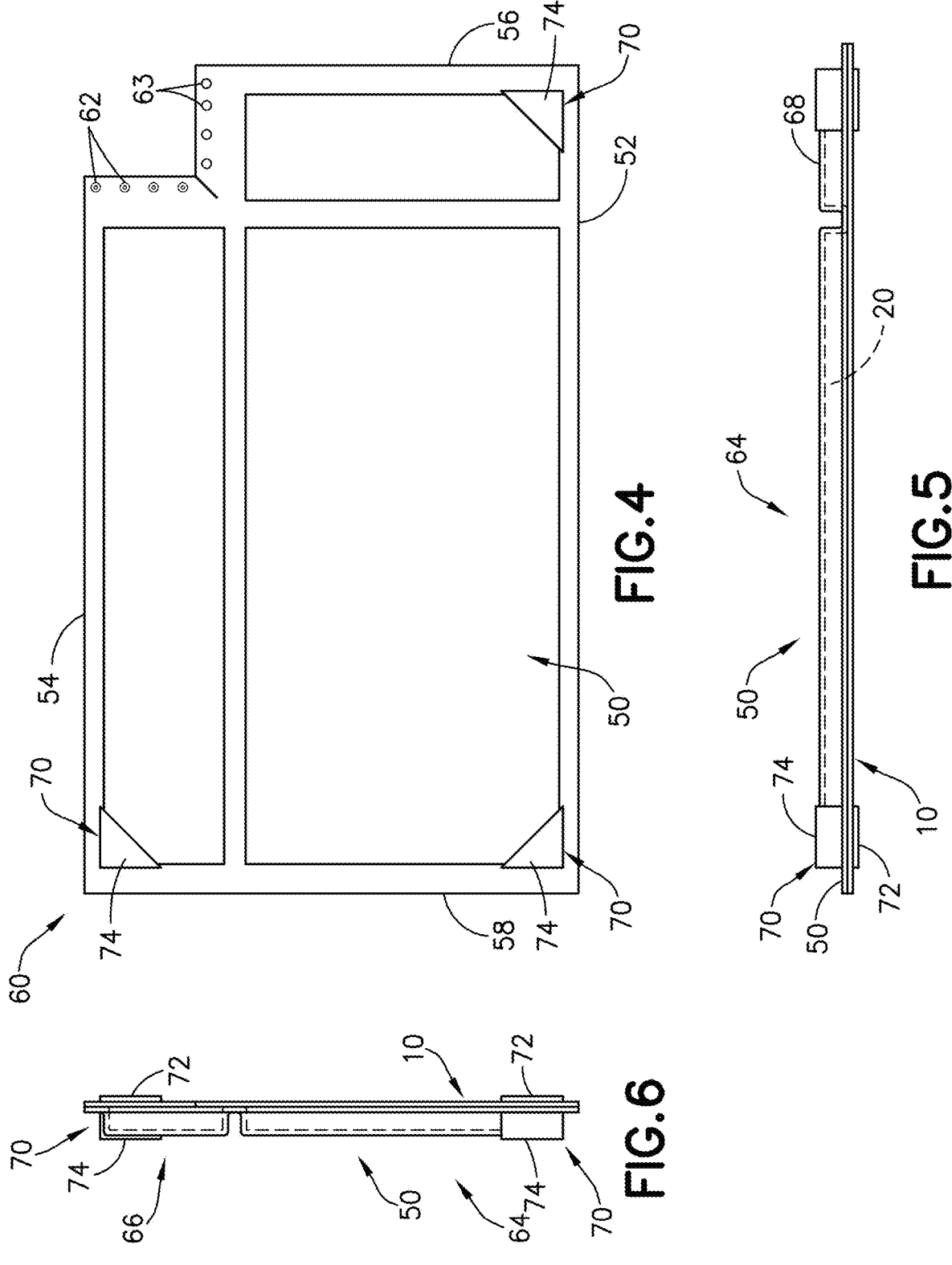
FIG. 4 is a top plan view of the fully assembled pet bed of the first embodiment in a collapsed condition for storage of the pet bed.
FIG. 5 is a front elevational view of the fully assembled pet bed of FIG. 4 in the collapsed condition.
FIG. 6 is a left side elevational view of the fully assembled pet bed of FIGS. 4 and 5 in the collapsed condition.
Figure 7:
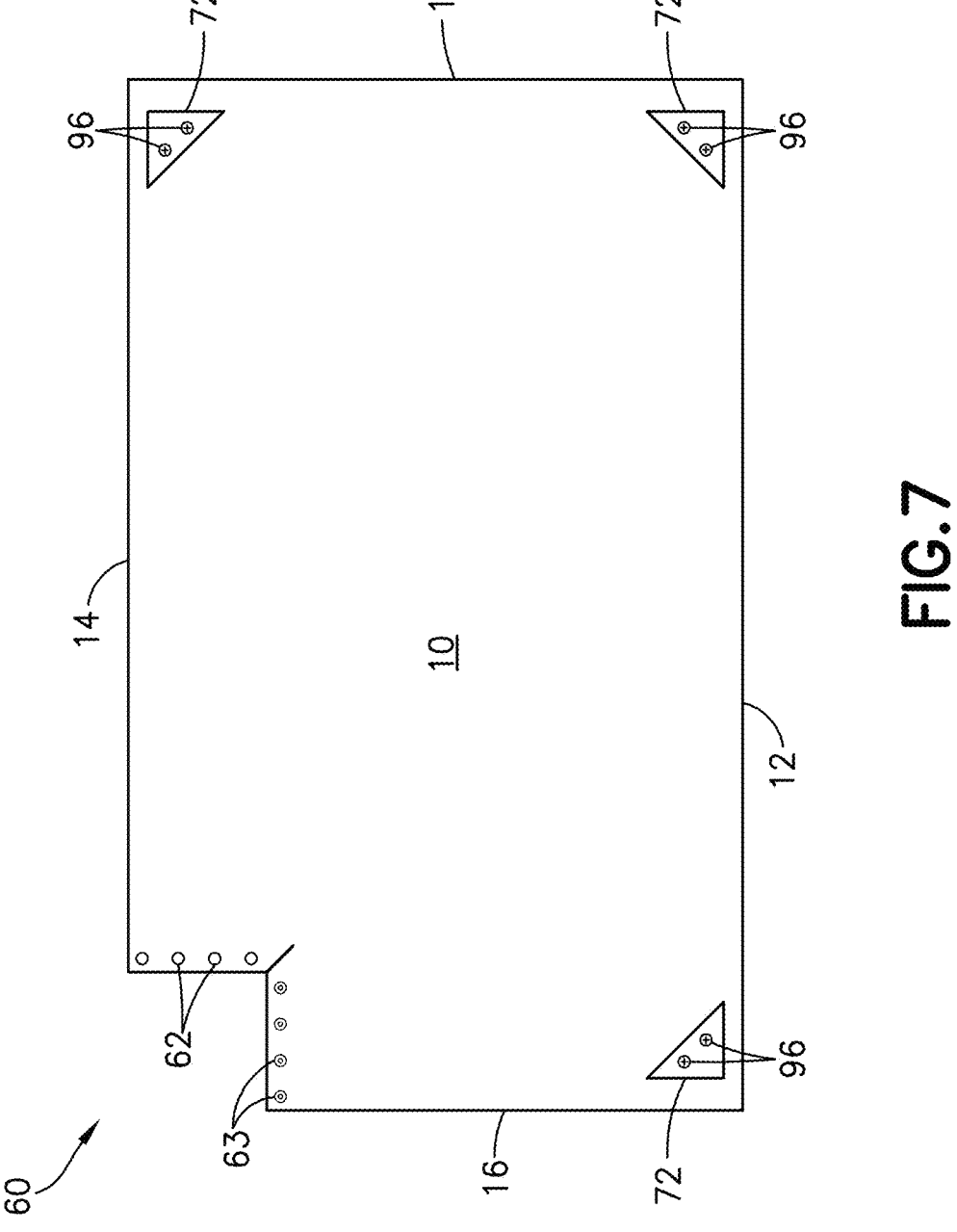
FIG. 7 is a bottom plan view of the fully assembled pet bed of FIGS. 4-6 in the collapsed condition.

A substantially rectangular top cover 50 is positioned over the base pad 20, the rear pad 30 and the side pad 40, as shown in FIGS. 4, 5 and 6. The top cover 50 has opposite front and rear edges 52 and 54 that register respectively with the front and rear edges 12 and 14 of the bottom cover 10. The top cover 50 also has opposite first and second side edges 56 and 58 that register respectively with the first and second side edges 16 and 18 of the bottom cover 10. The top cover 50 is connected to the bottom cover 10 at locations between the bottom pad 20 and the rear pad 30 and similarly at locations between the bottom pad 20 and the side pad 40. Additionally, the top cover 50 is connected to the bottom cover 10 at locations spaced inward from the edges 52-58 of the top cover 50 and the corresponding edges 12-18 of the bottom cover 10. This connection of the top cover 50 and the bottom cover 10 may be achieved by heat sealing, ultrasonic welding or other fusing or adhering technologies known to those skilled in the art. The fused areas between the bottom pad 20 and the rear pad 30 may include a linear area substantially centrally between the bottom pad 20 and the rear pad 30 to define a living hinge that enables easy rotation of the rear pad 30 relative to the base pad 20. Similarly, the fused areas between the bottom pad 20 and the side pad 40 may include a linear area substantially centrally between the bottom pad 20 and the rear pad 30 to define a living hinge that enables easy rotation of the side pad 40 relative to the base pad 20. The fusing of the top cover 50 to the bottom cover 10 forms the assembly of the bottom and top covers 10 and 50 and the pads 20, 30 and 40 into a pet bed 60 that is illustrated in FIGS. 4-6 in a collapsed planar condition suitable for storage.

The fused areas of the bottom cover 10 and the top cover 50 near the first side edge 36 of the rear pad 30 and the fused areas of the bottom cover 10 and the top cover 50 near the rear edge 44 of the side pad 40 are formed with mateable snap members 62 and 63 for holding these areas of the pet bed 60 in proximity to one another to define the erected condition that is suitable for use with vertical corners.

The assembly of the bottom cover 10, the pads 20, 30 and 40 and the top cover 50, as illustrated in FIGS. 4-6, form a collapsed pet bed 60 that is suitable for convenient space-saving storage when not in use. The area of the collapsed pet bed 60 where the base pad 20 is enveloped by the bottom and top covers 10 and 50 forms a base 64 or pet sleeping surface for the erected pet bed 60. The area of the collapsed pet bed 60 where the rear pad 30 is enveloped by the bottom and top covers 10 and 50 forms a rear wall 66. The area of the collapsed pet bed 60 where the side pad 40 is enveloped by the bottom and top covers 10 and 50 forms a side wall 68.

As noted above, pet dogs are known to gnaw on projections, particularly if the pet bed is used in the stressful environment of a boarding facility. The corners of the pet bed 60 are conveniently accessible for such gnawing. A dog easily could gnaw through the covering material of a pet bed, thereby making the pet bed unsightly and possibly affecting the utility of the pet bed. Accordingly, the pet bed 60 is provided with corner guard assemblies 70, as illustrated in FIGS. 8-11. Each corner guard assembly 70 includes a base wall 72 and a cover 74, each of which is molded from a hard synthetic resin, such as acrylonitrite butadiene styrene (ABS) having a thickness of about 3 mm. The base wall 72 of this embodiment is an isosceles right triangular wall with two perpendicular edges 76 and 78 meeting at a right angle corner 80 and a hypotenuse edge 82 intersecting each of the perpendicular edges 76 and 78 at 45° angles. Lips project from the perpendicular edges 76 and 78 and will nest with edges of the cover 74 to form a rabbet joint. Other embodiments do not have the illustrated lips and do not form a rabbet joint. Two circular holes 84 are formed through the base wall 72 at positions inward of the edges 76, 78 and 82. In this embodiment, the holes 84 are spaced equal distances from the hypotenuse edge 82. The cover 74 of the corner guard assembly 70 includes a triangular cover wall 85 and rectangular sidewalls 86 and 88 projecting down from the cover wall 86. Ends of the sidewalls 86 and 88 remote from the triangular cover wall 85 are formed with downwardly projecting lips that nest with the lips that project from the perpendicular edges 76 and 78 of the base wall 72 to form a rabbet joint in this embodiment. Other embodiments do not have lips and do not form a rabbet joint. The sidewalls 86 and 88 meet at a corner 90 that aligns with the corner 80 when the base wall 72 and the cover 74 are assembled. The cover 74 also is formed with two tubular posts 94 that project from the triangular cover wall 85. Projecting distances of the tubular posts 94 from the triangular cover wall 85 substantially equal the projecting height of each rectangular sidewall 86 and 88 from the triangular cover wall 85. Additionally, the tubular posts 94 are disposed to register with the circular holes 84 in the base wall 72 when the cover 74 is assembled onto the base wall 72.

Figure 8:
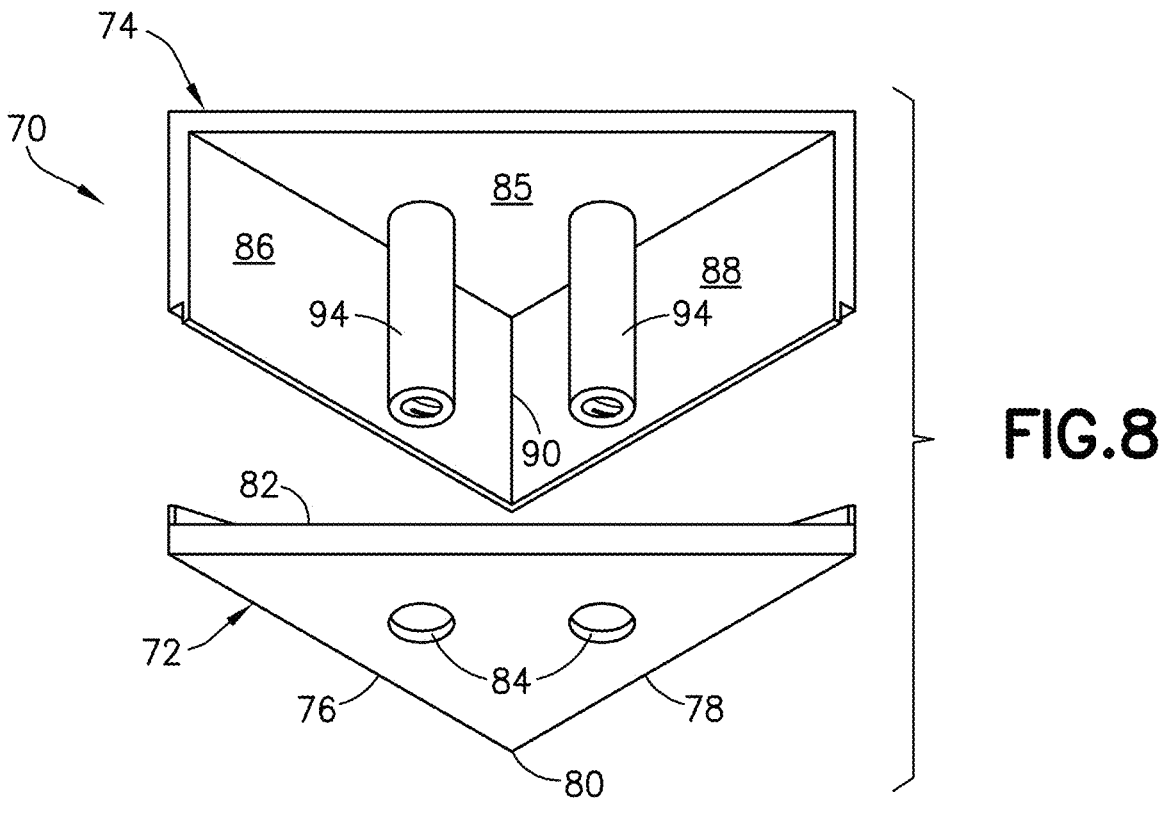
FIG. 8 is an exploded perspective view of a corner guard assembly.
Figure 9:
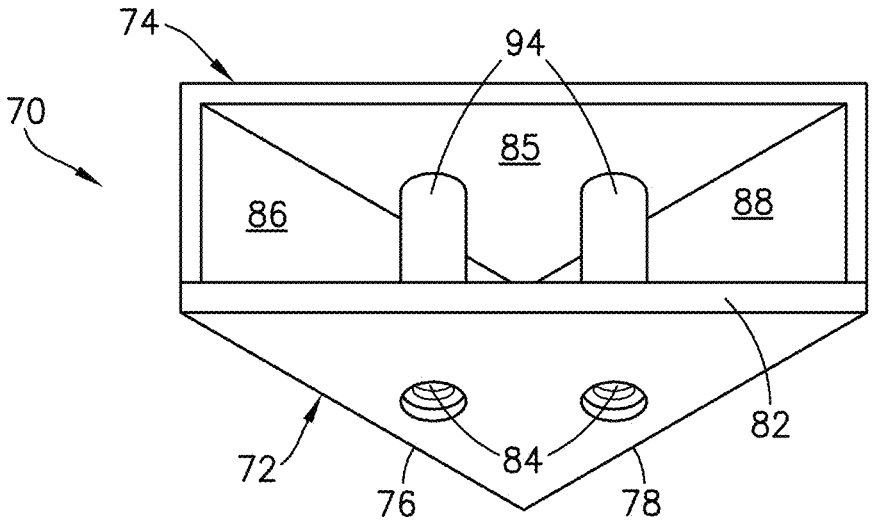
FIG. 9 is a perspective view of the corner guard assembly of FIG. 8 in the assembled condition.
Figure 10:
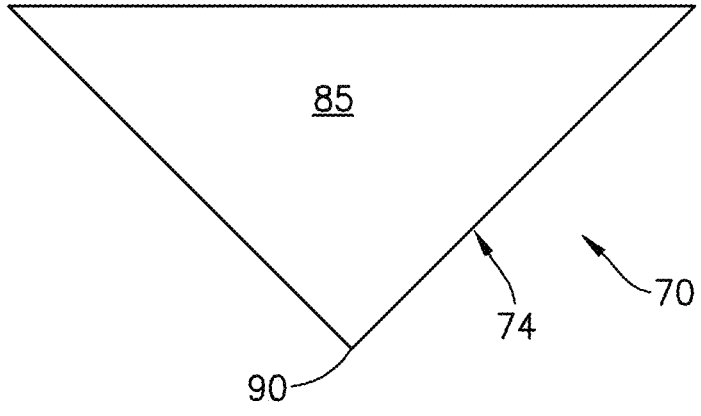
FIG. 10 is a top plan view of the corner guard assembly of FIG. 9.
Figure 11:
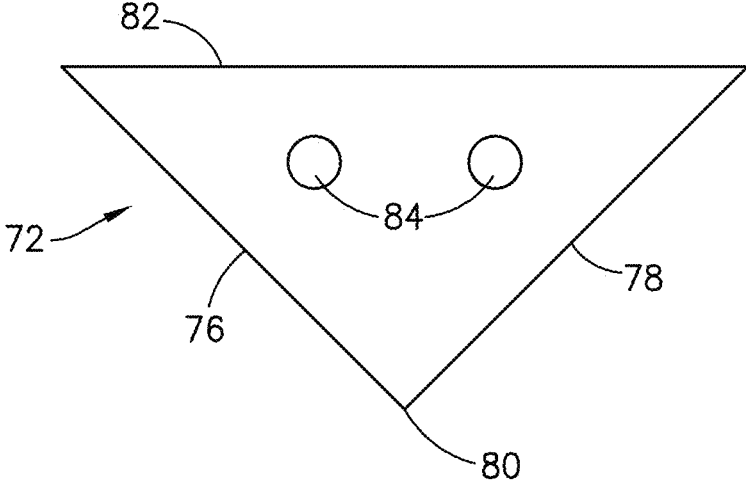
FIG. 11 is a bottom plan view of the corner guard assembly of FIG. 9.

The corner guard assembly 70 is mounted to the corners of the collapsed pet bed 60 before converting the collapsed pet bed 60 into the erected form shown in FIG. 8. In this regard, holes are formed in corner regions of the collapsed pet bed 60 at positions to receive the tubular posts 94. The holes can be formed by punching or drilling, for example. A base wall 72 of a corner guard assembly 70 then is positioned at a corner region of the collapsed pet bed 60 so that the circular holes 84 in the base wall 72 align with the holes formed in the corner region of the collapsed pet bed 60. The cover 74 then is mounted to the surface of the collapsed pet bed 60 opposite the surface that has the base wall 72 and the tubular posts 94 are passed through the holes formed in the corner region of the collapsed pet bed 60 so that projecting ends of the internally threaded posts 94 register with the holes 84 formed in the base wall 72. Screws 96 then are passed through the holes 84 and are tightened into the tubular posts 94. This tightening of the screws 96 causes parts of the base wall 72 of the corner guard assembly 70 adjacent the side edges 76 and 78 to be urged tightly toward the projecting ends of the rectangular sidewalls 86 and 88 of the cover 74 of the corner guard 70. More particularly, the outer edge regions of the collapsed pet bed 60 are sandwiched tightly between the base wall 72 and the projecting ends of the rectangular sidewalls 86 and 88 of a respective cover 74 in accordance with this embodiment of FIG. 12. Thus, the corner guard assembly 70 is engaged securely on the respective corner of the collapsed pet bed 60 and prevents gnawing damage to the corner of the pet bed 60. This process is completed for each convex corner of the collapsed pet bed 60.

Figure 12:
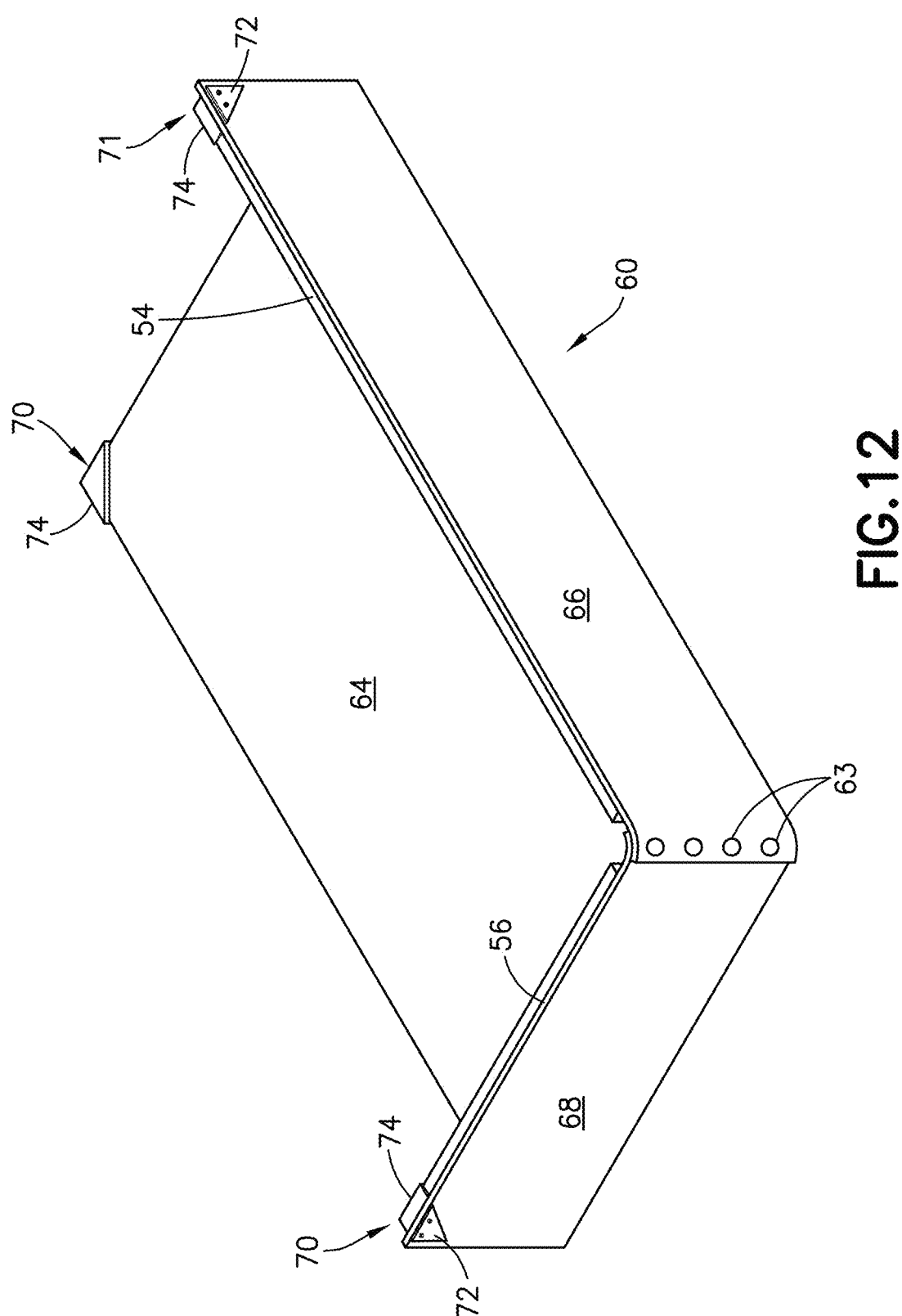
FIG. 12 is a perspective view of the pet bed of FIGS. 1-7 in an erected condition condition for use.

The collapsed pet bed 60 can be converted into the erected form shown in FIG. 12 merely by rotating the rear wall 66 up relative to the base 64 and by rotating the side wall 68 up relative to the base 64. In this erected condition, the rear wall 66 and the sidewall 68 abut. The rear wall 66 and the side wall 68 can be retained in this erected condition by releasably snapping the snap members 62, 63. The erected pet bed 60 shown in FIG. 8 provides a corner area near where the base 62, the rear wall 64 and the side wall 66 meet. This corner area defines a position where a pet can nestle to provide a comfortable area of reduced stress, fear and anxiety, particularly when the pet bed 60 is used at a boarding facility away from the home of the pet.

Figure 13:
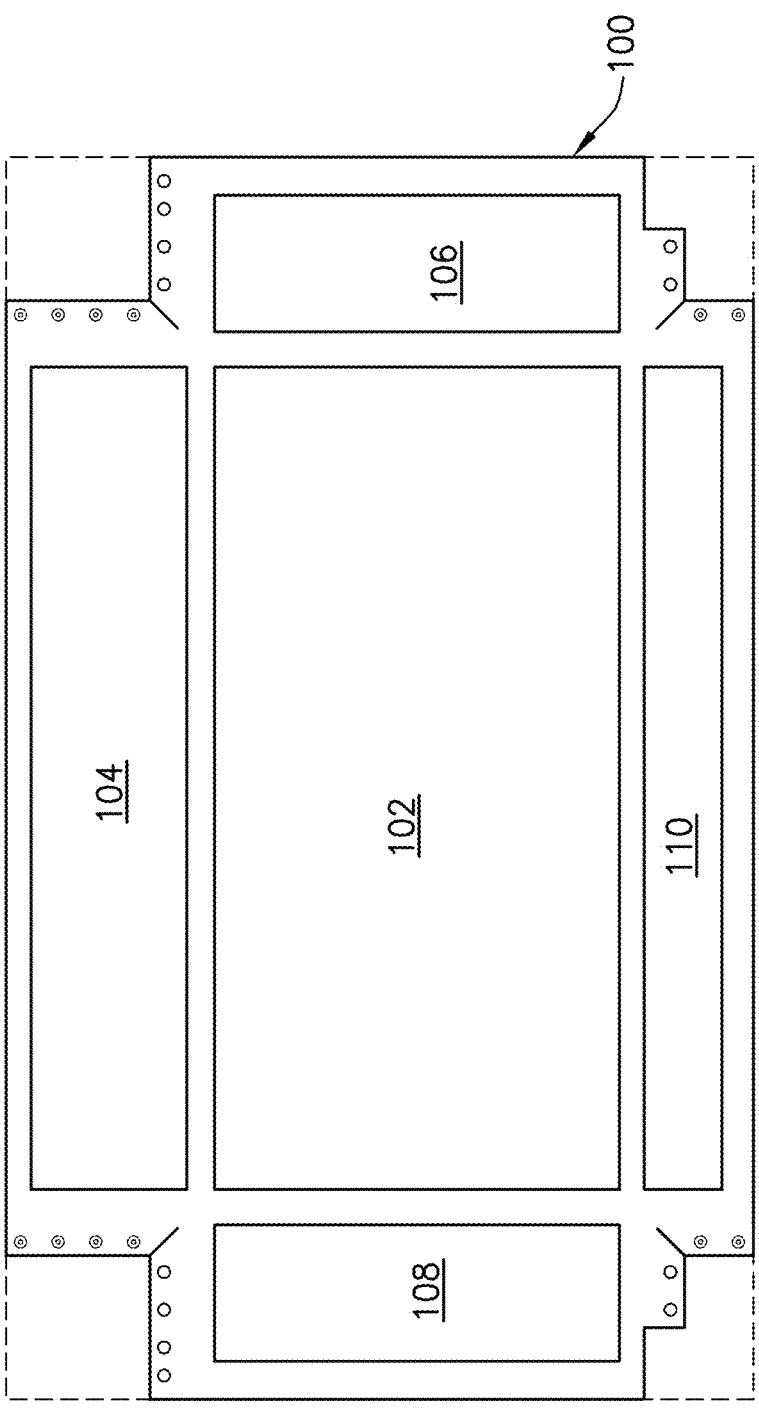
FIG. 13 is a top plan view of a second embodiment of a pet bed in a collapsed condition.
Figure 14:
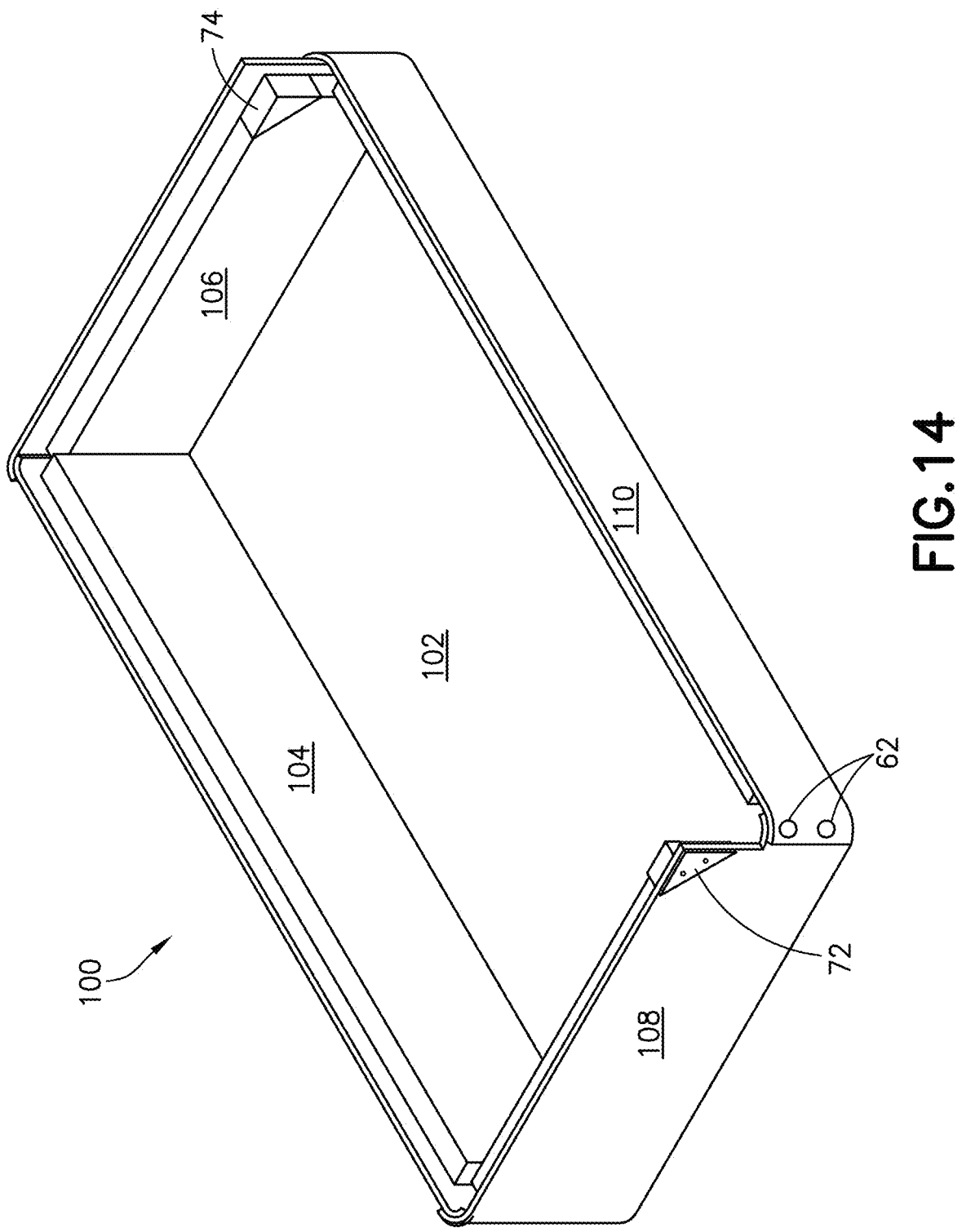
FIG. 14 is perspective view of the ped bed of FIG. 13 in an erected position.

A second embodiment of the pet bed according to the invention is identified generally by the numeral 100 in FIGS. 13 and 14. More particularly, the broken lines in FIG. 13 identify areas of the upper and lower covers that have been cut away during the manufacturing process, thereby leaving the collapsed pet bed 100. The pet bed 100 differs from the pet bed 60 illustrated in FIGS. 4-6 and 8 in that the pet bed 100 includes a base 102, a rear wall 104, a first side wall 106, a second side wall 108 and a front wall 110. The first and second side walls 106 and 108 are hinged to opposite first and second sides of the base 102. The front wall 110 is hinged to the base 102 along a front of the base 102 at a fold line parallel to the fold between the base 102 and the rear wall 104. Opposite first and second ends of the front wall 110 are secured in their erected condition of FIG. 14 by snap members 62 and 63 identical to those described above with respect to the pet bed 60. The embodiment of the pet bed 100 illustrated in FIGS. 13 and 14 is configured with the front wall 110 having a height less than the height of the rear wall 104 and the side walls 106 and 108. The height of the front wall 110 illustrated in FIG. 14 is suitable for whelping. Other embodiments can have the height of the front wall 110 substantially equal the heights of the rear wall 104 and the first and second side walls 106 and 108.

Other embodiments of the pet bed can be provided without departing from the scope of the invention. For example, front corners of the sidewalls illustrated in FIGS. 12 and 14 can be configured as rounded corners with correspondingly configured corner guard assemblies. Connection means other than the snaps 62, 63 can be provided, such as D-rings, clips, buttons or hook and loop fastening systems. The pet bed described and illustrated herein can be used with other pet beds. For example, some known pet beds have a rectangular frame formed by PVC pipes joined and supported above a floor by short legs also formed from PVC pipes. A mesh fabric spans the PVC frame and a pet sleeps on the fabric of this prior art bed. That known pet bed does not provide an elevated corner into which the pet can nestle. However, the pet bed described herein can be supported on the mesh fabric and can be dimensioned to nest within the PVC pipes that form the frame. This combination of the pet bed described herein with the prior art elevated pet bed provides the desirable corner on the prior art pet bed that has no such corner.

A further embodiment may comprise a base with plural convex corners and no sidewall or rear wall permanently connected to the base. Thus, the base may be rectangular and may have four convex corners. The above-described corner guard assemblies may be mounted respectively to each convex corner of the base. One or more sidewalls, a rear wall and/or a front wall can be attached releasably to the base by any of the connecting means described above.

The invention claimed is:

1. A collapsible pet bed comprising:
   a base with opposite top and bottom surfaces, opposite front and rear ends and opposite first and second sides, the front end and the second side of the base meeting at a convex base corner;
   a rear wall with opposite top and bottom surfaces, opposite front and rear ends and opposite first and second sides, the front end of the rear wall being connected hingedly to the rear end of the base for rotation of the rear wall between a position where the rear wall and the base are in a common plane and an erected position where the rear wall is substantially perpendicular to the base, the rear end and the second side of the rear wall meeting at a convex rear wall corner;
   a side wall with opposite top and bottom surfaces, opposite front and rear ends and opposite first and second sides extending between the front and rear ends thereof, the second side of the side wall being connected hingedly to the first side of the base for rotation of the first side wall between a position where the first side wall and the base are in the common plane and an erected position where the first side wall is substantially perpendicular to the base, the front end of the first side wall and second side of the first side wall meeting at a convex side wall corner;
   connecting means disposed adjacent the first side of the rear wall and the rear end of the side wall, the connecting means adjacent the first side of the rear wall being releasably connectable to the connecting means adjacent the rear end of the side wall for releasably holding the rear wall and the side wall in the erect positions thereof to define a vertical corner between the rear wall and the side wall; and corner guard assemblies mounted respectively adjacent at least one of the base corner, the rear wall corner and the side wall corner, each of the corner guard assemblies having opposed first and second members configured to cover parts of the top and bottom surfaces adjacent the respective corner, and connecting members holding the first and second members of the respective corner guard assemblies adjacent the respective corner so that areas of the top and bottom surfaces adjacent the respective corner are sandwiched between the first and second members of the respective corner guard assembly.

2. The collapsible pet bed of claim 1, further comprising:

a bottom cover with a front edge aligned along both the front end of the base and the front end of the first side wall, a rear edge aligned along the rear end of the rear wall, a first side edge aligned along the first side of the first side wall and a second side edge aligned along both the second side edge of the base and the second side of the rear wall.

3. The collapsible pet bed of claim 2, further comprising:

a base pad disposed on the bottom cover at a position spaced rearward from the front edge of the bottom cover and at a position spaced from the second side edge of the bottom cover;

a rear pad disposed on the bottom cover at a position spaced rearward from the base pad and spaced forward from the rear edge of the bottom cover; and a first side pad disposed on the bottom cover at a position spaced from the base pad and at a position spaced from the first side edge of the bottom cover.

4. The collapsible pet bed of claim 3, further comprising:

a top cover covering the base pad, the rear pad and the first side pad, the top cover having a front edge registered with the front edge of the bottom cover, a rear edge registered with the rear edge of the bottom cover, a first side edge registered with the first side edge of the bottom cover and a left side edge registered with the left side edge of the bottom cover, the top cover being affixed to the top cover at: positions extending along the front edges of the bottom cover and the top cover, positions extending along the first side edges of the bottom cover and the top cover, positions extending along the second side edges of the bottom cover and the top cover and positions extending along the rear edges of the bottom cover and the top cover.

5. The collapsible pet bed of claim 4, wherein:

the top cover is connected to the bottom cover at positions between the base pad and the rear pad to define the rear hinge, and the top cover is connected to the bottom cover at positions between the base pad and the first side pad to define the first side hinge.

6. The collapsible pet bed of claim 1:

wherein one of the corner guard assemblies is disposed at the convex rear wall corner of the collapsible pet bed so that areas of the top and bottom surfaces adjacent the rear wall corner are sandwiched between the first and second members of the respective corner guard assembly.

7. The collapsible pet bed of claim 1, wherein:

the side wall is a first side wall, and the collapsible pet bed further comprise second side wall with opposite top and bottom surfaces, opposite front and rear ends and opposite first and second sides extending between the front and rear ends thereof, the first side of the second side wall being connected hingedly to the second side of the base along a second side hinge for rotation of the second side wall between a position where the second side wall and the base are in a common plane and an erected position where the second side wall is substantially perpendicular to the base, the front end of the second side wall and second side of the second side wall meeting at a convex second side wall corner, and wherein one of the corner guard assemblies is disposed at the convex second side wall corner of the collapsible pet bed so that areas of the top and bottom surfaces adjacent the second side wall corner are sandwiched between the first and second members of the respective corner guard assembly.

8. The collapsible pet bed of claim 1, wherein:

the connection means are screws.

9. The collapsible pet bed of claim 1, wherein:

the connecting means comprise interengageable snap members releasably engageable with one another for holding the rear wall and the first side wall in the erected positions thereof.

10. The collapsible pet bed of claim 7, further comprising:

a front wall with opposite front and rear ends and opposite first and second side ends, the rear end of the front wall being connected hingedly to the front end of the base along a front hinge for rotation of the front wall between a position where the front wall and the base are in a common plane and an erected position where the front wall is substantially perpendicular to the base; and wherein the connecting means further are disposed along the first and second side ends of the front wall and along the front ends of the first and second side walls, the connecting means along the first side of the front wall being releasably connected to the connecting means along the front end of the first side wall, and the connecting means along the second side of the front wall being releasably connected to the connecting means along the front end of the second side wall for releasably holding the front wall and the first and second side walls in the erected positions thereof so that the front wall and the first and second side walls define vertical corners between the front wall and the first and second side walls.

11. The collapsible pet bed of claim 10 wherein:

a projecting height of the front wall from the base is less than projecting heights of the rear wall and the first and second side walls from the base.

12. A pet bed comprising:

a base with opposite top and bottom surfaces and side surfaces extending between the top and bottom surfaces, at least two of the side surfaces meeting to define at least one convex corners on the base; and at least one corner guard assembly mounted to the base at a position adjacent to the at least one convex corner, the at least one corner guard assembly having opposed first and second members configured to cover parts of the top and bottom surfaces and the side surfaces of the base adjacent the at least one convex corner, and at least one connecting member holding the first and second members of the at least one corner guard assembly on the base adjacent the at least one convex corner so that areas of the base adjacent the at least one convex corner are sandwiched between the first and second members of the respective corner guard assembly.

13. The pet bed of claim 12, wherein:
the at least one corner guard assembly is formed from a synthetic resin that is harder than the base.

14. The pet bed of claim 13, further comprising:
at least one aperture formed in the base in proximity to the at least one convex corner, the first member of the at least one corner guard assembly having at least one tubular projection passing through the at least one aperture in the base, the threaded connecting member extending through the second member and threadedly engaging in the tubular projection of the at least one corner guard assembly for holding the first and second members of the respective corner guard assembly sandwiched around areas of the base in proximity to the at least one convex corner.

15. The pet bed of claim 14, wherein:
the at least one aperture formed in the base in proximity to the at least one convex corner comprises plural apertures, the at least one tubular projection passing through the at least one aperture in the base comprises plural tubular projections passing respectively through plural apertures, and the at least one threaded connecting member holding the first and second members of each of the corner guard assemblies on the base adjacent the respective convex corners so that areas of the base adjacent the at least one convex corner are sandwiched between the first and second members of the respective corner guard assembly.

16. The pet bed of claim 15, wherein:
the at least one convex corner comprises plural convex corners and the at least one corner guard assembly comprises plural corner guard assemblies mounted respectively on the plural convex corners.

17. The pet bed of claim 12, wherein:
the at least one convex corner comprises plural convex corners and the at least one corner guard assembly comprises plural corner guard assemblies mounted respectively on the plural convex corners.

* * * * *